Dec. 23, 1941.    W. YOUNG    2,267,067
DIRECTION SIGNAL
Filed Nov. 13, 1939    2 Sheets-Sheet 1
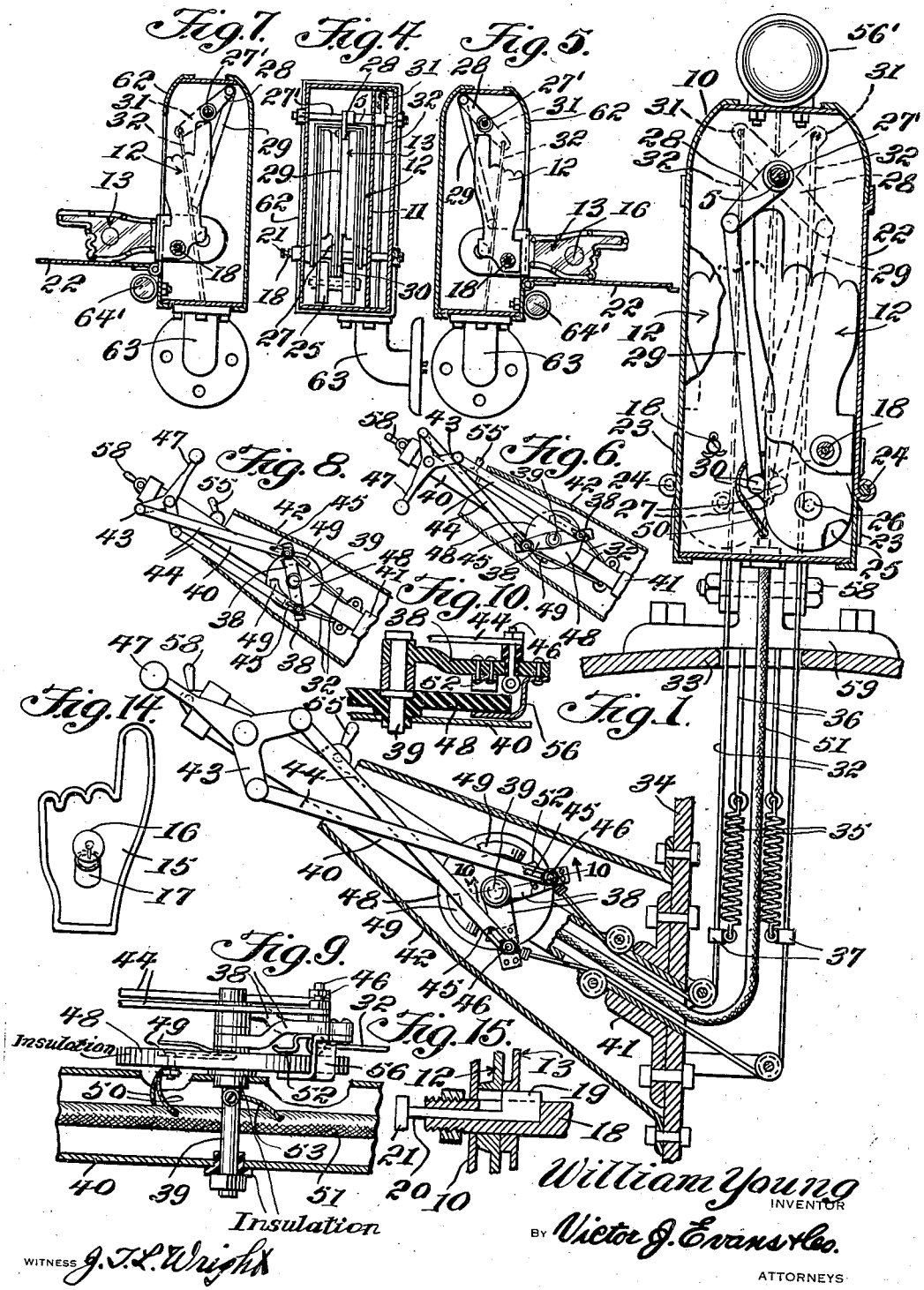
William Young INVENTOR
BY Victor J. Evans & Co.
ATTORNEYS
WITNESS J. T. L. Wright Dec. 23, 1941.  W. YOUNG  2,267,067
DIRECTION SIGNAL
Filed Nov. 13, 1939  2 Sheets-Sheet 2
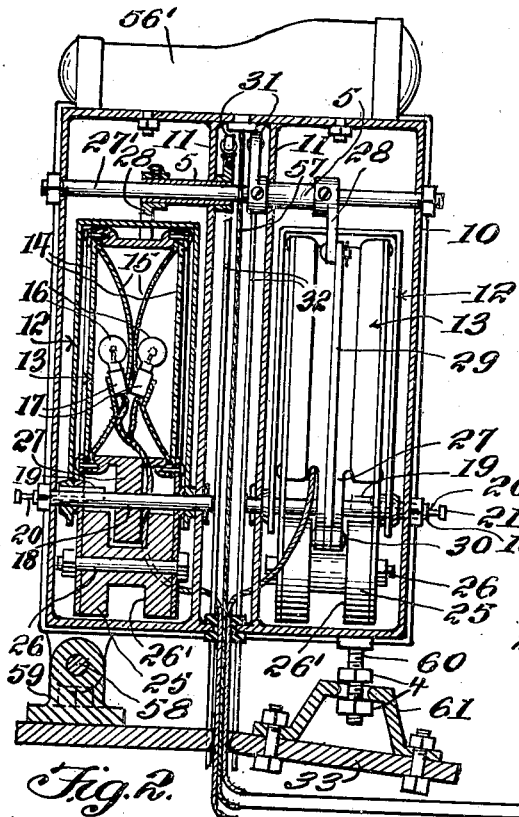
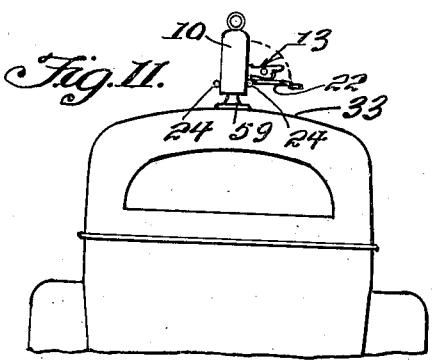
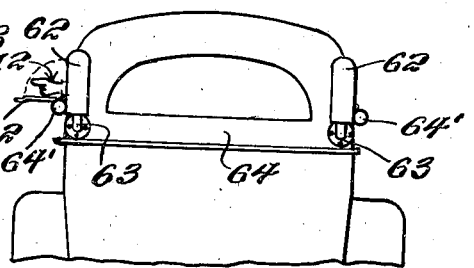
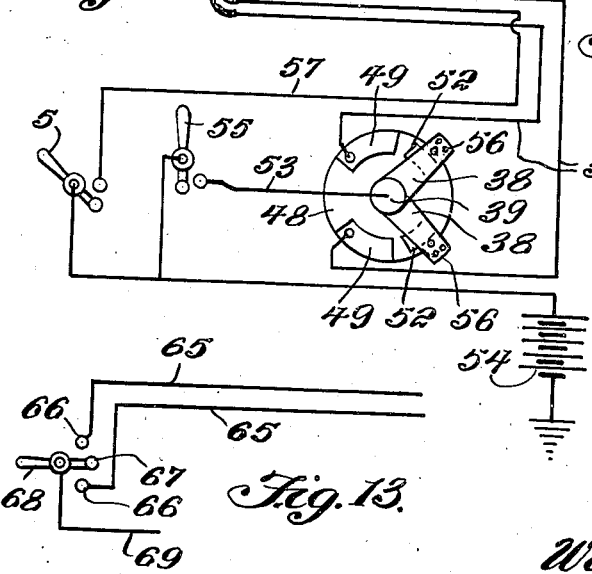
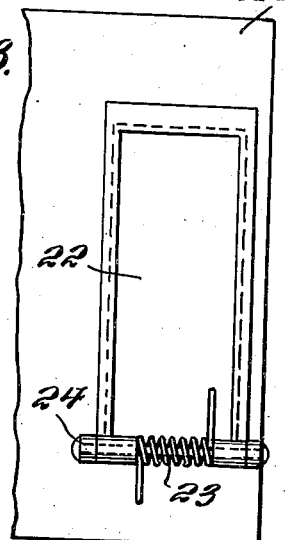
William Young INVENTOR
BY Victor J. Evans & Co.
ATTORNEYS
WITNESS J. T. K. Wright Patented Dec. 23, 1941

2,267,067

UNITED STATES PATENT OFFICE 2,267,067

DIRECTION SIGNAL

William Young, Avondale, Ala.

Application November 13, 1939, Serial No. 304,248

2 Claims. (Cl. 177—327)

This invention relates to a direction signal and has for an object to provide a day and night signalling device for all types of motor vehicles to indicate the driver's intention to turn.

A further object is to provide a device of this character which in one form of the invention provides a casing having three compartments, two of which each house telescopically assembled pointers each simulating a hand, both pointers of one compartment indicating a right turn and both pointers of the other compartment indicating a left turn, one of the pointers in each compartment being adapted to be illuminated for use in night travel, the third compartment being a central compartment which houses the cables for actuating the pointers.

A further object of the invention is to provide telescopically assembled pointers mounted on a common pivot and adapted to be moved as a unit, or one alone moved, and including an outer pointer of opaque material and an inner pointer having a signal lamp, both pointers being moved as a unit to display the opaque pointer during day travel, and the inner signal light displaying pointer being moved alone for night travel.

A further object is to provide pointers which are counterbalanced to automatically return to housed position within the casing when the actuating cables are slackened off after each signalling operation.

A further object is to provide a device of this character having novel switch means combined with the actuating cables and disposed so as to be easily operated by the driver to simultaneously operate the pointers and the signal bulbs of the night driving pointers.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a longitudinal sectional view of direction signal apparatus constructed in accordance with one form of the invention.

Figure 2 is a cross sectional view of the signal casing shown in Figure 1 with parts broken away to show the day and night telescoped pointers, and showing the electrical connections of the night pointers.

Figure 3 is a fragmentary end elevation of the casing showing one of the doors through which a respective pointer may be extended to the horizontal beyond the casing.

Figure 4 is a cross sectional view of a modified form of the invention, showing a single pointer in the casing for each intended turn.

Figure 5 is a cross sectional view of the form of the invention shown in Figure 4, showing the right pointer in operative position for indicating a turn.

Figure 6 is a fragmentary view showing the actuating mechanism for operating the modified form of the invention, in right hand turn signalling position, as shown in Figure 5.

Figure 7 is a cross sectional view of the modified form of the invention showing the left hand turn signalling pointer in operative position.

Figure 8 is a detailed sectional view of the actuating apparatus of the modified form of the invention to actuate the pointer to the operative position shown in Figure 7.

Figure 9 is a detailed sectional view showing the actuating levers and switch assembly of the form of the invention shown in Figure 1.

Figure 10 is a detailed sectional view of part of the actuating lever and switch assembly taken on the line 10—10 of Figure 1.

Figure 11 is a fragmentary rear elevation of a motor vehicle showing the direction signal mounted on the top thereof, the signal being of the double type.

Figure 12 is a fragmentary rear elevation of a motor vehicle showing the direction signals mounted thereon, of the single type.

Figure 13 is a diagrammatic view of the manually controlled switch for controlling the night circuits of the single type form of the invention.

Figure 14 is a front elevation of the reflector and signal bulb of the night driving pointer.

Figure 15 is a detailed sectional view showing the spline for connecting the illuminated and opaque pointers as a unit to the pivot shaft, or for connecting only the illuminated pointer to the shaft.

Referring now to the drawings in which like characters of reference designate similar parts in the various views, 10 designates a casing having a pair of longitudinal partitions 11 dividing the casing into three compartments, that is, a central compartment for the actuating mechanism, and outer compartments for signal pointers.

In the form of the invention shown in Figures 1 and 2 there are two nested pointers 12 and 13 in each compartment, for respectively day and night driving, the pointers of one compartment pointing to the right when operated, and the pointers of the other compartment pointing to the left when operated.

The pointers are in the shape of a hand and the outermost of the nested pointers is opaque for day driving, while the innermost is provided with glass panes 14 in the sides, reflectors 15 back of the panes, and a signal bulb 16 carried by a socket 17 in the reflector as best shown in Figure 14. Both nested pointers are mounted on a respective pivot shaft 18 which is journaled at the ends in the wall of the casing in one of the partitions. Both nested pointers are offset outwardly on the shaft 18 from the vertical median line of the pointers, as best shown in Figure 1, so that the pointers have the greater part of their weight in rear of the shaft to prevent the pointers accidentally falling outwardly to signalling position.

As best shown in Figure 15 a spline 19 is mounted in the shaft and is provided with a stem 20 which terminates in a button 21 exposed exteriorly of the casing to be pushed inward by the driver to connect the night driving pointer 13 individually with the shaft, or to be pulled outwardly by the driver to connect both pointers for movement as a unit with the shaft. The purpose of this is to permit the opaque pointer, with the illuminated pointer locked as a unit therein, being moved to the horizontal through a respective door 22 formed in the end wall of the casing, to day signalling position, and to permit the illuminated pointer alone to be moved to signalling position at night, while the opaque pointer remains housed in the casing.

The door 22 is provided with a spring 23 on its hinge pintle 24, the spring being tensioned when the door is pushed open by the pointer to return the door to closed position when the pointer is withdrawn into the casing after each signalling operation.

The night driving pointer 13 in each compartment is provided at the bottom with a substantially cylindrical counterbalancing weight 25 which is bolted as shown at 26 in Figure 2 to the bottom of the pointer below the pivot shaft 18. The weight is provided with a circumferential recess 26' to receive the bearing 27 of the pointer in which bearing the pivot shaft 18 is loosely received. When the pointers are both coupled to the shaft to move as a unit the counterbalancing weight 25 returns both pointers to concealed position within the casing after each actuation. When the inner pointer is uncoupled from the outer pointer for night driving by manually pushing in on the spline 19, as previously described, the weight will return the inner pointer to normal concealed position after each actuation.

For actuating the pointers a rod 27' is secured at the ends to the walls of the casing 10 and supports a hollow shaft 5 which is provided with a crank arm 28 which is connected to a link 29 which extends downwardly in the casing 10 and is connected to a pivot pin 30 carried by the bearing 27 of the inner pointer 13. The shaft 5 is equipped within the center compartment with a crank arm 31 to which a cable 32 is connected. The cable extends downwardly in the partition and is directed through the part of the vehicle 33 on which the signal casing is mounted and suitably conducted to actuating means located on the vehicle dash 34, later described in detail. A helical spring 35 is connected at one end to the vehicle by a connector 36 and at the other end is connected to the actuating cable 32 by a clip 37.

When the actuating cable is pulled the shaft 5 will be rotated to move the link 29 and turn the pointers if coupled together, or the inner pointer if uncoupled, to signalling position, at the same time tensioning the spring 35. When the cable is slackened off by the actuating means the spring 35 contracts and slackens off the cord between it and the crank arm 31 of the shaft 5 so that the counterbalancing weight may return the pointer to normal position within the casing.

Each actuating cable 32 is connected to a respective crank arm 38 carried by the upper end of the shaft 39, best shown in Figure 9, which shaft is journaled at the ends in a tube 40 which opens through and is connected to the dash 34 by a tubular bracket 41, best shown in Figure 1. The shaft is housed in a tubular house 42 carried by the dash and projects from the outer end from the house where it is equipped with a bell crank lever 43. A pair of crossed links 44 connect the ends of the bell crank lever with the crank arm 38. The lower ends of the crank arms are provided with longitudinal slots 45 which pivotally and slidably receive respective pivot pins 46 which connect the links to the crank arms 38. A handle lever 47 is connected to the bell crank lever 43.

When the handle lever is moved in one direction one of the links will slide on its pivot pin 46 while the other link will pull on its pivot pin and turn the respective crank arm to pull on the respective cable and actuate the respective pointers. When the handle lever is turned in the opposite direction the other link will slip on its pivot pin and the reverse of the just described operation takes place. Thus the pointers are operated to indicate a right or left turn since one of the actuating cables is connected to the right turn indicating pointers and the other is connected to the left turn indicating pointers in the signal casing.

Switch means for controlling the illumination of the night driving pointers is associated with the shaft 39 and comprises a stationary disk 48 of insulated material mounted axially on the shaft outside of the tube 40. A pair of leaf spring contacts 49 are fixed to the upper surface of the disk and are connected to respective conductors 50 of a cable 51 which is trained through the bottom of the casing to permit the conductors being connected to the signal lamps 16 of respective night driving pointers.

Leaf spring contacts 52 are carried by the crank arms 48 which latter are electrically connected to the shaft 39. A conductor 53 is connected to the shaft 39 and is connected to a source of electricity 54 as best shown in Figure 2. A manually-controlled switch 55 controls flow of current to the shaft 39 and the contacts 52. When the contacts 52 carried by the arms 38 engage the contacts 49 carried by the disk 48 current will be automatically supplied to the illuminating bulbs of the respective pointers for night driving.

Angular guides 56 are secured to the crank arms 38 and engage underneath the disk 48 to guide movement of the crank arms on the disk and assure good wiping engagement of the crank arm contacts 52 with the stationary disk contacts 49.

A lamp 56', best shown in Figures 1 and 2, is mounted on top of the casing 10 as best shown in Figure 2 and is connected to the source of electricity by a conductor 57. A manually controlled switch 5 controls flow of current from the source of electricity to the lamp. This lamp may be lit at all times at night if desired.

The form of the invention just described is adapted to be mounted on the roof of a vehicle as shown in Figure 11, and for this purpose the casing 10 is hinged at the bottom to a pivot pin 58 carried by hinge ears 59, Figure 2, which are mounted on the vehicle. This hinge permits the casing 10 being adjusted to extend vertically and to accomplish this adjustment an adjusting screw 60 is loosely secured to a bracket 61 which is mounted on the vehicle. The adjusting screw is fixed to the bottom of the casing at the opposite end thereof from the pivot pin 58 and nuts 4 on the screw may be turned upwardly or downwardly to level the lamp casing 10.

In some cases it may be necessary to mount the pointers so that the right hand pointers may project from the rear of the vehicle at the right hand side thereof and the left hand pointers may project from the rear of the vehicle at the left hand side, as best shown in Figure 12. To accomplish this individual casings for the pointers are shown at 62 in Figures 4, 5, and 7. In these figures the pointers are identically the same as described for each compartment of the casing 10 and it is not thought they need further description. Each casing is mounted on a respective bracket 63 which may be secured to the rear wall 64 of the vehicle or any other portion of the rear of the vehicle.

The actuating means for the pointers in each casing are constructed identically the same as described in connection with the partitioned casing and these, as well as the pointers, have been given identical numbers. In this modified form of the invention instead of placing the lamp on top of the casing as shown in Figure 1, the lamp is placed on one side of the casing, as shown at 64' in Figures 5 and 7. This necessitates a somewhat different wiring scheme as indicated in Figure 13 in which the conductors 65 to the lamps are connected to stationary switch contacts 66. The movable contact 67 carried by the switch handle 68 has wiping engagement with these stationary contacts to selectively energize either the right or the left lamp and the movable contact 67 is connected by a conductor 69 to the source of electricity.

In operation when the driver intends to make a turn, he swings the bell crank lever handle 47 in a direction to pull the cable corresponding to a desired pointer. In the case of night driving he will close the manual switch 55, and prior to this will disconnect the night driving pointer from the day driving pointer by manipulating the button 21. When the handle 47 is then swung to direction indicating position the signal lamps of the night driving pointer will be energized.

With respect to the utility of the opaque pointer masking the illuminated pointer for day driving it will be pointed out that this device is more particularly designed for trucks of the interstate freight duty type which travel continuously with a change of drivers at predetermined points. The masking pointer conceals the illuminated pointer even if the switch is inadvertently left on to make sure that no unauthorized lights are displayed in states where there are ordinances against daytime display of lights.

From the above description it is thought that the construction and operation of the invention will be fully understood without further explanation.

What is claimed is:

1. In a direction indicator, a casing, a pair of telescopically assembled pointers mounted on a common pivot in the casing, the outer pointer being opaque, the inner pointer being transparent, a counterbalancing weight assembled with the pointers for normally holding the pointers in vertical released position in the casing, means for selectively swinging both pointers as a unit to horizontal signalling position beyond the casing for day driving or swinging the innermost pointer alone to signalling position while the outermost pointer remains housed in the casing, a signal circuit for illuminating the innermost pointer switch contacts in the signal circuit controlled by the pointer swinging means to energize the signal circuit simultaneously with movement of the inner pointer individually to signalling position for night driving, and a main switch in the signal circuit.

2. In a direction indicator, a casing, a pivot shaft in the casing, a pair of telescopically assembled pointers having bearings receiving the pivot shaft, a manually operable spline carried by the pivot shaft and adapted to lock both pointers for movement as a unit or to unlock the innermost pointer for movement alone while the outermost pointer remains stationary in the casing, means for swinging the pointers from vertical released position in the casing to horizontal signalling position beyond the casing, a counterbalancing weight assembled with the pointers for normally holding the pointers in vertical released position in the casing, the outermost pointer being opaque, the innermost pointer being transparent, a signal circuit for illuminating the innermost pointer switch contacts in the circuit controlled by the pointer swinging means to energize the circuit simultaneously with movement of the inner pointer individually to signalling position, and a main switch in the signal circuit.

WILLIAM YOUNG.